United States Patent Office 3,295,983
Patented Jan. 3, 1967

3,295,983
FEEDING SILKWORM LARVAE FEED CONTAINING PROPIONIC ACID
Keizo Kato, Kanagawa-ken, and Satoshi Ide and Kazuto Okada, Tokyo, Japan, assignors to Ajinomoto Co., Inc., and Katakura Industry Co., Ltd., both of Tokyo, Japan
No Drawing. Filed Sept. 20, 1965, Ser. No. 488,741
Claims priority, application Japan, Sept. 26, 1964, 39/55,148
3 Claims. (Cl. 99—2)

This invention relates to silkworm feed, and more particularly to artificial silkworm feed.

The silkworm has been known as a monophagous insect and only mulberry leaves were known as a silkworm feed for a long time. The supply of mulberry leaves is subject to the influence of the weather and requires much labor.

Therefore, it has been proposed heretofore to use artificial feed for silkworms which may contain mulberry leaf powder; several kinds of protein, such as soybean protein; oil, such as soybean oil; carbohydrates, such as starch, cellulose, glucose, sucrose; agar; vitamins, such as the vitamin B group, vitamin C, etc.; inorganic salts, such as $K_3PO_4$, $K_2HPO_4$, $MgSO_4$, $CaCO_3$, $K_2SO_4$, $KCl$, $SiO_2$ etc.; sterols, such as $\beta$-sitosterol, cholestrol, ergosterol, $\beta,\gamma$-hexanol; some terpenoids; and feeding stimulants, such as isoquercitrin and morin.

Silkworms may be raised through the entire larval stage on such artificial feed, and made to produce cocoons. However, artificial feed is still inferior to natural mulberry leaves in the growth rate of the silkworm larvae.

We have now discovered that the growth rate of silkworm larvae fed on artificial feed is accelerated when the feed contains propionic acid and/or its salts, such as potassium propionate, sodium propionate, magnesium propionate, calcium propionate, or zinc propionate.

According to the invention, the silkworm feed contains from 0.001 to 5 weight percent (on a dry basis) of the propionic acid and/or its salts. The additive (propionic acid and/or its salts) can be admixed with the feed composed of any of the aforementioned or other known silkworm feed ingredients in any convenient manner.

The following examples further illustrate the invention.

EXAMPLE 1

Composition of basic feed: mulberry leaf powder 48%, potato starch 15%, defattened soybean meal 10%, cellulose powder 20%, glucose 5%, ascorbic acid 2%, and necessary quantity of vitamin B group.

0% (comparison), 0.05%, 0.1%, 0.2%, 0.4%, 0.8%, 1.6%, 3.2% by weight of calcium propionate were respectively added to batches of the feed, and each batch was kneaded with 1.5 times its weight of water, heated with steam for 10 minutes, and cut into slices.

Newly hatched silkworm larvae were reared on the said feed at a temperature of 25° C. and at 75% relative humidity for 15 days.

Forty silkworms were tested for each experiment.

The growth rate percentage and average weight of surviving larvae is shown in Table 1.

TABLE 1

| Amount of calcium propionate added (percent) | Percentage and average weight of surviving larvae | | | |
|---|---|---|---|---|
| | After 10 days | | After 15 days | |
| | Percent | Av. wt., mg. | Percent | Av. wt., mg. |
| 0 | 100 | 37.9 | 75 | 78.7 |
| 0.05 | 90 | 38.7 | 80 | 88.0 |
| 0.1 | 95 | 46.1 | 90 | 116.8 |
| 0.2 | 100 | 53.4 | 95 | 138.0 |
| 0.4 | 100 | 53.0 | 85 | 102.1 |
| 0.8 | 100 | 53.0 | 85 | 100.3 |
| 1.6 | 100 | 50.2 | 80 | 98.4 |
| 3.2 | 95 | 40.1 | 80 | 82.2 |

The beneficial effect of the calcium propionate addition on the growth rate is evident from Table 1.

EXAMPLE 2

Composition of basic feed: mulberry leaf powder 10%, potato starch 15%, defattened soybean meal 15%, cellulose powder 44.7%, glucose 10%, soybean oil 3%, soybean sterol 0.3%, ascorbic acid 2%, vitamin B group, necessary quantity.

0% (comparison), 0.05%, 0.1%, 0.2%, 0.4%, 0.8%, 1.6%, 3.2% by weight of propionic acid were respectively added to batches of the basic feed, and each batch was kneaded with 1.5 times its weight of water, heated with steam for 10 minutes, and cut into slices.

Newly hatched silkworm larvae were reared on the said feed at temperatures of 25° C. and at 75% relative humidity for 15 days.

Forty silkworms were tested for each experiment.

The growth rate (percentage and average weight of surviving larvae) is shown in Table 2.

TABLE 2

| Amount of calcium propionate added (percent) | Percentage and average weight of surviving larvae | | | |
|---|---|---|---|---|
| | After 10 days | | After 15 days | |
| | Percent | Av. wt., mg. | Percent | Av. wt., mg. |
| 0 | 82 | 20.4 | 70 | 54.3 |
| 0.05 | 85 | 24.4 | 74 | 68.2 |
| 0.1 | 85 | 26.4 | 76 | 71.4 |
| 0.2 | 85 | 27.2 | 75 | 68.0 |
| 0.4 | 85 | 25.3 | 75 | 63.0 |
| 0.8 | 85 | 25.0 | 75 | 62.6 |
| 1.6 | 85 | 24.5 | 75 | 58.8 |
| 3.2 | 80 | 20.8 | 70 | 55.7 |

What we claim is:
1. A method of rearing silkworm larvae which comprises feeding to said larvae a feed containing nutrient ingredients and 0.001% to 5% by weight, on a dry basis, of a growth promoting additive selected from the group consisting of propionic acid and its physiologically tolerated salts.
2. A method as set forth in claim 1, wherein said additive is calcium propionate.
3. A method as set forth in claim 1, wherein said additive is propionic acid.

(References on following page)

References Cited by the Examiner

UNITED STATES PATENTS

| | | |
|---|---|---|
| 1,990,343 | 2/1935 | Naurse _____ 99—2 |
| 2,903,355 | 9/1959 | Belasco. |
| 2,965,488 | 12/1960 | Belasco _____ 99—2 |

OTHER REFERENCES

Fukuda et al.: XI, Internationaler Kongress für Entomologie, Verhandlunger, Band III, Symposium 3–4, pp. 163–165, Istituto di Entomologia Agraria dell' Universita di Pavia (Italy), 1960.

Fukuda et al.: Nature, vol. 196, pp. 53–4, Oct. 6, 1962.

Hamamura et al.: Nature, vol. 194, pp. 754–5, May 26, 1962.

Richardson et al.: "Studies on Feed Spoilage," 6 pages, Bulletin 879, Texas Agricultural Experiment Station, College Station, Texas.

A. LOUIS MONACELL, *Primary Examiner.*

D. J. DONOVAN, *Assistant Examiner.*